F. D. BROWN.
TRACTOR WHEEL FOR MOTOR TRUCKS.
APPLICATION FILED APR. 18, 1919.
1,315,622.
Patented Sept. 9, 1919.
2 SHEETS—SHEET 1.
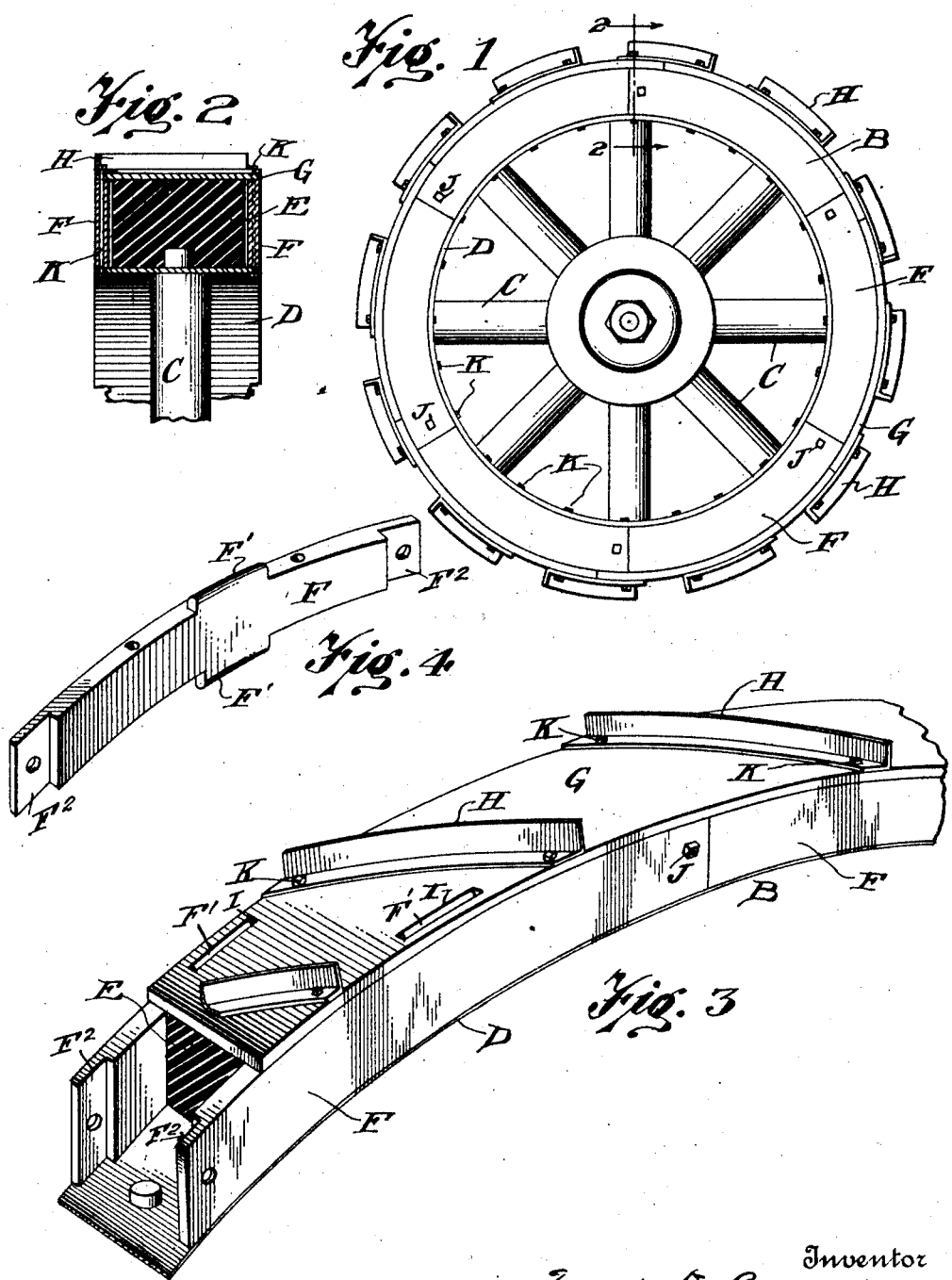

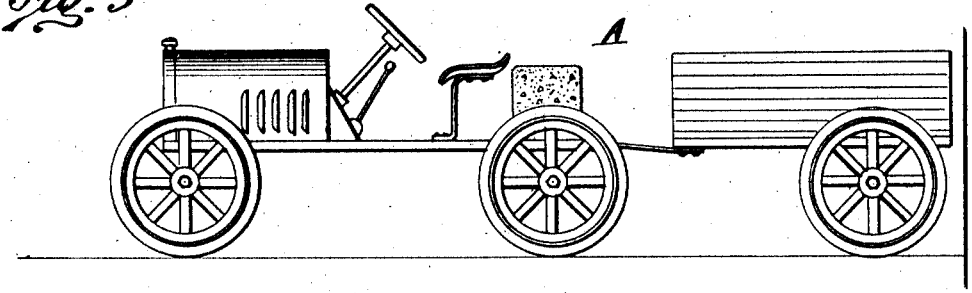
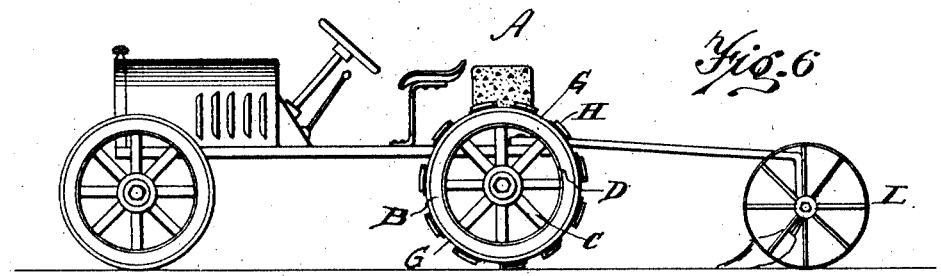
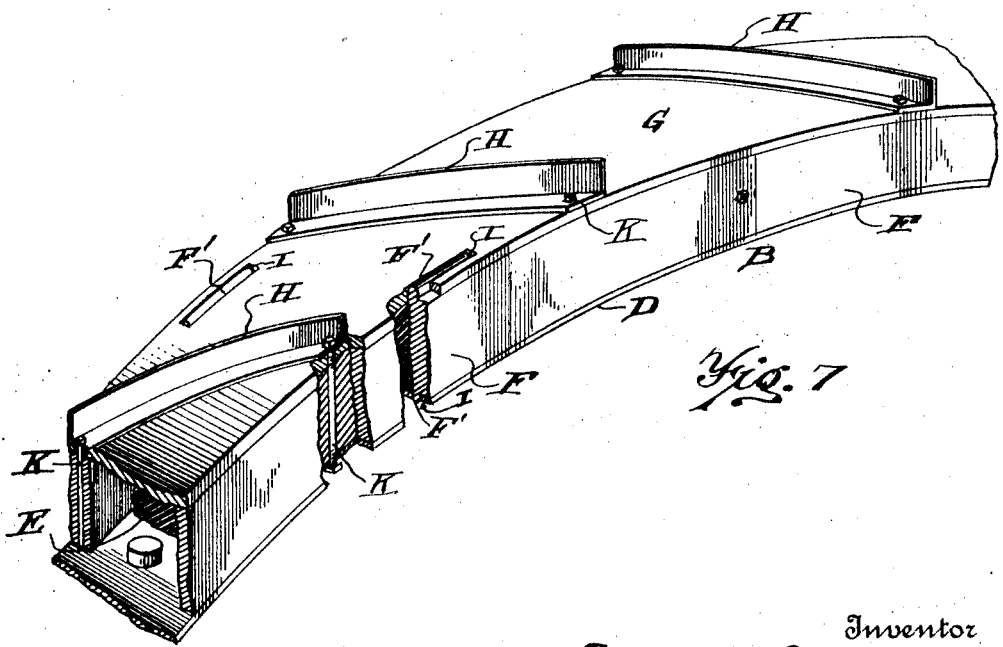

UNITED STATES PATENT OFFICE.

FRANK D. BROWN, OF DETROIT, MICHIGAN.

TRACTOR-WHEEL FOR MOTOR-TRUCKS.

1,315,622.          Specification of Letters Patent.          Patented Sept. 9, 1919.

Application filed April 18, 1919. Serial No. 291,012.

*To all whom it may concern:*

Be it known that I, FRANK D. BROWN, citizen of the United States, residing at Detroit, county of Wayne, State of Michigan, have invented a certain new and useful Improvement in Tractor-Wheels for Motor-Trucks, and declare the following to be a full, clear, and exact description of the same, such as will enable others skilled in the art to which it pertains to make and use the same, reference being had to the accompanying drawings, which form a part of this specification.

My invention relates to tractor wheels for motor trucks and consists in means adapted to convert the wheels of a motor truck into tractor wheels, that the truck may serve a dual purpose,—namely, either as a truck or a tractor, as required.

It will be apparent that if the usual farm motor truck employed to haul farm products to the market could be adapted for plowing, cultivating, or other field work, its sphere of usefulness would be greatly enlarged, because when not employed in hauling farm products to town, it could be used for plowing or cultivating crops in the field.

It is therefore one of the objects of this invention to provide means whereby the wheels of a motor truck may be readily converted into tractor wheels in order that the truck may be employed either as a truck or tractor as may be required.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawing forming part of this specification:

Figure 1 is a side elevation of a truck wheel as it would appear with my invention installed thereon.

Fig. 2 is a cross-sectional view through the rim of the wheel, on line 2—2 of Fig. 1.

Fig. 3 is a fragmentary perspective view of the truck rim and parts for converting the same into a tractor rim.

Fig. 4 is a perspective view of one of the arc-shaped segmental plates forming the side protecting wall of the rubber tire.

Fig. 5 is a side elevation of a motor truck with the usual truck wheels installed.

Fig. 6 is a similar view of the truck, but drawing a plow, and with the tractor rims installed in place of the truck rims shown in the preceding figure,—the rubber tires of the forward wheels being protected by a plain rim,—the rear wheels being supplied with lugs to insure traction.

Fig. 7 is a fragmentary perspective view of the tractor rim with parts broken away to show the bolts,—which pass through the several elements including the traction lugs,—to secure the parts together; also the projecting lugs on the arc-shaped plates forming the tire protecting side walls which extend into the slots of the rims,—and also the overlapping of the abutting ends of the sections of the rim by the traction lugs.

Referring now to the letters of reference placed upon the drawings:—

A, denotes a truck. B, one of its rear wheels. C, its spokes. D, the rim, and E, the usual hard rubber tire.

F, indicates a plurality of arc-shaped segmental plates resting upon the projecting rim D, and forming side walls to protect the rubber tire from injury.

G, denotes a rim also formed in sections and provided with a plurality of projecting traction lugs H, bolted thereto, and overlapping the abutting ends of said sections.

The segmental plates F, are provided with lugs F', projecting from each edge of the plates into slots I, formed in the respective rims D and G.

The ends of the segmental plates are rabbeted as indicated at $F^2$ that they may overlap each other,—the overlapping parts being secured together by bolts J.

K, indicates a plurality of radial bolts extending through apertures provided in the segmental side plates F, the respective rims D, and G, and the projecting traction lugs H;—to secure the parts together. L, denotes a plow connected with the truck or tractor.

Having now indicated the several parts by reference letters, the construction and operation of the device will be readily understood.

It will be seen that the truck as such may be used for hauling farm produce, but when required for work in the field may be quickly converted into a tractor and its rubber tires secured from wear by inclosing them within the protecting walls of the device shown—the truck being then adapted for all field work, such as plowing, cultivating, etc., required for a small farm.

Having thus described my invention, what I claim is:—

1. The combination with a motor truck wheel, of a tire, a rim on which the tire is mounted having edges projecting beyond the sides of the tire, a plurality of arc-shaped plates supported upon the rim one each side of the tire, an outer rim formed in segments resting upon the edges of the segmental arc-shaped plates, having traction lugs on its outer face, and a plurality of radially disposed bolts extending through the rims and also the arc-shaped plates to secure the several parts together.

2. The combination with a motor truck wheel, of a tire, a rim on which the tire is mounted having edges projecting beyond the sides of the tire and provided with a plurality of slots spaced apart adjacent to each edge of the rim, an outer rim encircling the tire provided with traction lugs, and a plurality of slots adjacent to each of its edges, a plurality of segmental arc-shaped overlapping plates bolted together forming two annular rings spaced apart and lodged between the inner and outer rims on each side of the tire, said segmental arc-shaped plates having lugs extending from their edges into the slots in the inner and outer rims, and a plurality of bolts spaced apart extending through holes in the inner and outer rims and through holes in the segmental arc-shaped plates, whereby the several parts may be secured together.

3. The combination with a motor truck wheel, of a tire, a rim on which the tire is mounted having edges projecting beyond the sides of the tire and provided with a plurality of slots spaced apart adjacent to each edge of the rim, an outer rim formed in sections, overlapping the tire and projecting beyond the sides of the latter with a plurality of slots spaced apart adjacent to each edge of the rim, traction lugs bolted to the outer rim and overlapping the abutting sections, a plurality of segmental arc-shaped plates forming two annular rings spaced apart and lodged between the inner and outer rims on each side of the tire, said segmental arc-shaped plates having lugs extending from their edges into the slots formed in the inner and outer rims, and a plurality of bolts extending through holes in the inner and outer rims and the segmental arc-shaped plates, to secure the several parts together.

In testimony whereof I sign this specification in the presence of two witnesses.

FRANK D. BROWN.

Witnesses:
S. E. THOMAS,
FRANK A. MARTIN.

Copies of this patent may be obtained for five cents each, by addressing the "Commissioner of Patents, Washington, D. C."